United States Patent [19]

Chow

[11] Patent Number: 5,323,186
[45] Date of Patent: Jun. 21, 1994

[54] FOCAL PLANE ARRAY FOR MAN AND MACHINE VISIONS

[75] Inventor: Sen-Te Chow, Alexandria, Va.

[73] Assignee: The United States of America as represented by the Secretary of the Army, Washington, D.C.

[21] Appl. No.: 899,838

[22] Filed: Jun. 17, 1992

[51] Int. Cl.$^5$ .............................................. H04N 3/14
[52] U.S. Cl. ................................... 348/166; 348/295
[58] Field of Search ............. 358/213.28, 113, 213.22, 358/213.31, 213.11; 250/208.1, 332; 348/295, 294, 166

[56] References Cited

U.S. PATENT DOCUMENTS

| | | | |
|---|---|---|---|
| 4,319,279 | 3/1982 | Bergen et al. .................. | 358/213.22 |
| 4,757,385 | 7/1988 | Hieda ............................. | 358/213.22 |
| 4,868,657 | 9/1989 | Samuels ......................... | 358/113 X |
| 5,070,406 | 12/1991 | Kinoshita .................... | 358/213.11 X |
| 5,140,147 | 8/1992 | Barnett ........................ | 358/213.22 X |

Primary Examiner—Joseph Mancuso
Assistant Examiner—Wendy R. Greening
Attorney, Agent, or Firm—Milton W. Lee; John E. Holford; Anthony T. Lane

[57] ABSTRACT

A method and means for converting a high resolution machine monitored photodiode array, comprising staircased linear sets of detectors operating in a time-delay-integration mode, to a low resolution visually monitored array, by delaying the output signal of odd sets in the staircase by the time required to scan one set and integrating the outputs of odd and even sets.

5 Claims, 1 Drawing Sheet

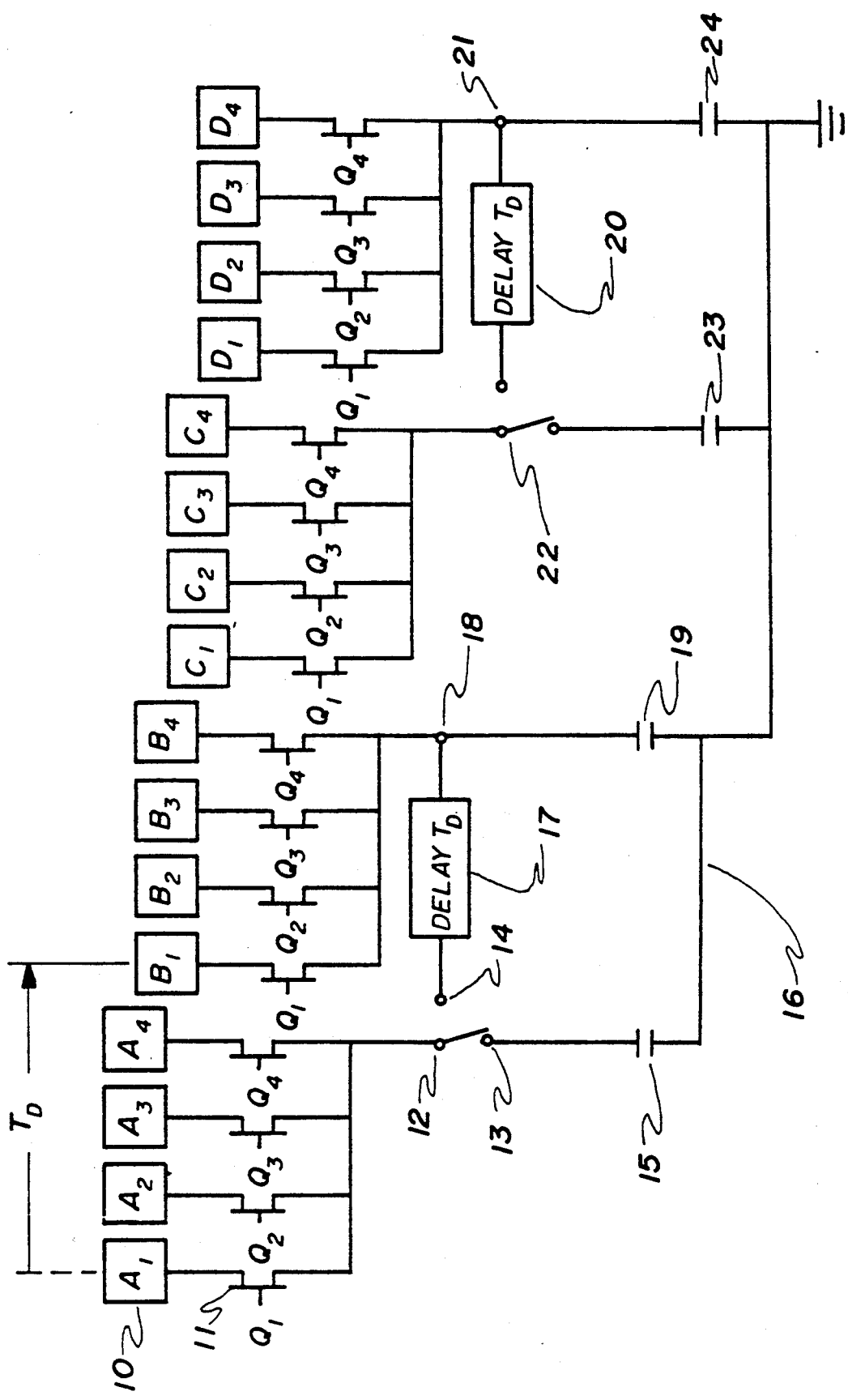

FOCAL PLANE ARRAY FOR MAN AND MACHINE VISIONS

BACKGROUND OF THE INVENTION

1. Field of the invention

The invention involves infrared imaging devices particularly imagers with focal plane arrays wherein rows of small infrared detectors are scanned in a Time Delay and Integration mode with an infrared image by means of a scanning mirror.

2. Prior Art

Infrared photoelectric imaging devices in the past have been developed chiefly for use by human observers. As the art of automatic target recognition (ATR) developed, it became clear that successful ATR devices require much more information than the human eye does to identify targets reliably. In other words, the resolution required by ATR devices is at least two times that required by simple navigation and surveillance type imaging systems. In systems where communication channels interconnect the imager with a remote display and/or a memory storage unit, this translates into a requirement for many wide band transmission elements and large banks of memory elements, when storage of the picture elements (pixels) is involved.

The primary object of the invention is to provide a method and means for using the same large focal plane detector arrays for both wide and narrow bandwidth applications.

SUMMARY OF THE INVENTION

A detector array employing time delay and integration (TDI) and having a large bandwidth is modified for use in narrow bandwidth applications by reducing the number of lines generated in the output display. The output signals from the detectors for two subsequent lines, for example, may be delayed and combined to simulate super detectors with at least twice the charge storage capability, by supplying the proper phase delay to the detector signals prior to image integration. This reduces the size and power required by the processing system at the expense of the resolution. The resolution remains more than satisfactory for human applications such as surveillance and navigation. This permits the same detector array to be used for both human and machine applications.

BRIEF DESCRIPTION OF THE DRAWINGS

The invention is best understood with reference to the attached drawings, wherein:

The drawing shows a small portion of a Focal Plane Array designed to generate a 960 line display image with novel phase delay circuits added to transform it to a 480 line imager.

DESCRIPTION OF THE PREFERRED EMBODIMENTS

The Forward Looking Infrared imager (FLIR) used by the U.S. military has evolved from, a single sophisticated IR photodiode or IR detector over which an IR image was scanned horizontally and vertically by mirrors, to a special line array of such photodiodes, which can generate the same TV-like output video signal with a single scanning mirror. Further development promises the elimination of the scanning mirror, by the use of a two dimensional array of staring photodiodes. The IR sensitive area on a diode or on a group of diodes represents one picture element (pixel) in the resulting video signal. The aspect ratio of the video image of the FLIR (width/height) is usually 1 or 4/3 like commercial TV video. Machine or ATR systems employ 960 line frames, while visual displays require only 480 lines. Machine systems are also more sensitive to the shape of the detectors. Square detectors are currently used to meet the requirements of their rotationally invariant moment feature set and augmentation error set.

By providing four identical, linear, parallel, but non-collinear sets of diodes, staircased in half diode steps as shown in the drawing, duplicate overlapping coverage has been provided to permit reasonable spacing of the diodes while insuring complete coverage of the field of view during line generation. Further, each line is generated by a set of four photodiodes, $A_1, A_2, A_3$ & $A_4$ or $B_1, B_2, B_3$ & $B_4$; which are sampled sequentially and combined using time delay integration (TDI). The use of a set of detectors, rather than just one, increases the signal to noise ratio, in this example by a factor of two. Thus an ATR FLIR with time delay integration and 960 line resolution uses four staggered or staircased columns of sets, each column extending normal to the direction of line generation with 240 sets per column.

According to the Standard Advanced Infrared System (SAIRS) used, for example, in the Army's Comanche FLIR, the image in FIG. 1 is scanned over the diodes from left to right so that the center of a pixel moves from the center of photodiode $A_1$ to a point directly over the center of detector $B_1$ after a time delay of $T_D$. These sets of detectors are overlapped normal to the direction of scan in order to provide proper over sampling of the field-of-view as discussed above. Each detector has its input electrode connected to a common potential source (not shown) and its output electrode connected to the input electrode of a separate TDI switch 11. The output TDI switch electrode for each set of detectors is connected to the set's primary output electrode which is also the input electrode of a capacitor, such as capacitor 15 provided expressly for the first set. The remaining electrodes of all such capacitors are connected to a common return 16. Each TDI switch has a control or gate electrode, which is sequentially supplied with one of four narrow clock pulses $Q_1$-$Q_4$. These pulses are timed to occur in sequence, as subscripted, at regular intervals with pulse $Q_1$ marking the beginning and end of each time (delay period $T_D$. To illustrate applicant's improvement, the pole electrode 12 of an SPDT switch is shown connected to the input terminal of the capacitor connected to the first and every odd lettered, i.e. A or C, set of detectors. A first closed-throw electrode 13 of the SPDT switch is connected to the input terminal of the capacitor. In the high resolution state shown, the detector array functions as required for machine operations in ATR systems. The open-throw electrode 14 of the SPDT switch is connected to the input of a pulse delay line 17, which provides a total time delay of $T_D$. The output of this delay line is connected to the input electrode 18 of the next capacitor 19 in the following even lettered set.

When the SPDT switches are thrown to their low resolution states, the current pulse from detector $A_1$ arrives at the input terminal 18 at the same time as a pulse from detector $B_1$. This same relationship occurs for all pulses from diodes A and B with matching subscripts. It also occurs for pulses from diodes C and D, and all such basic sequential pairs which constitute the remainder of each row in the array. The electrodes 12, 18, etc. for every set are also the output nodes for pixels in the high resolution state. In the low resolution state only the electrodes for even lettered sets, i.e. B or D, such as electrodes 18, 28, etc. are secondary output nodes. Delay line 20, electrode 21, switch 22 and capacitors 23 and 24 correspond to elements 17, 18, 12, 15, and 19, respectively.

As is well understood in the art, most of the circuitry shown is easily fabricated in integrated silicon chips as a charge-coupled-device (CCD). The diodes are an exception because a FLIR requires III-V or II-VI type materials in its photodiodes which have the electrical bandgaps to absorb and detect far-infrared thus producing a compound structure, the fabrication of which is well within current skill in the art. The TDI and SPDT switches may be channel type transistors acting as charge injectors. In CCD terminology the capacitors are just large charge wells and the delay lines are called bucket-brigade structures.

The SPDT switches and capacitors associated with odd lettered sets may be eliminated to provide a low resolution circuit and the SPDT switches and delay lines 17, 20, etc. may be deleted to provide a high resolution only circuit. Thus by stocking two silicon chips and one mating array chip a variety of needs can be satisfied. If the SPDT switches are retained as chip elements, e.g. each switch being a pair of transistors with a common source electrode and oppositely polarized gates; the resultant imager can be used in a man or machine system, which can be switched between high and low resolutions by the application of pulses to reverse the gate polarizations. The resolution can be further diminished, or the field of view reduced, by applying the same principle to the remaining even lettered secondary outputs; creating half as many tertiary outputs and thus obtaining ever increasing signal to noise ratios.

Industrial applicability of this invention includes, but is not limited to: military surveillance systems, medical apparatus and agricultural surveillance systems.

This preferred embodiment is not intended to restrict the invention to the precise embodiment or embodiment described.

I claim:

1. In a FLIR type imager having an array with R rows of S identical parallel linear sets of D photodiodes where $Y=R*S$, the sets in each row being arranged end to end in a non-collinear staircase arrangement, wherein said photodiodes in each set are scanned by the same pixel portion of an IR image and sequentially switched on while being scanned, the outputs of the D photodiodes within each set being interconnected by a different one of Y first delay circuit means to provide time delay integration of output signals from said D diodes into one of Y low noise primary raster line signals, each said first means defining a primary raster-line output for a different one of said Y signals; the improvement wherein:
a different one of Y/2 second delay circuit means is connected between each odd order primary output and the next higher even order primary output, defining Y/2 primary pairs of said primary raster-line outputs, to synchronize and integrate said primary output signals from each said primary pair; said Y/2 second means defining Y/2 secondary raster-line outputs and increasing the resulting output signal to noise ratio.

2. An imager according to claim 1, further including:
one of Y/4 third delay circuit means connected between each odd order secondary output and the next higher even order secondary output, defining Y/4 pairs of said secondary raster-line outputs to synchronize and integrate said secondary output signals;
said Y/4 third circuit means defining Y/4 tertiary raster-line outputs and further increasing the resulting output signal to-noise-ratio.

3. An imager according to claim 1; further including the structural features, wherein:
said photodiode array is formed on a substrate of compound semiconductor material having electrical bandgaps which selectively absorb far-infrared, and
each of said delay circuit means is part of a silicon based charge-coupled-device electrically coupled to said array as a readout device.

4. A method of reducing the resolution of an image from Y to $V=Y/2$ raster lines per scan, said imager having a large array for photodiodes separated into R rows of S linear parallel staircased sets of D diodes so that $Y=R*S$, wherein the diodes in each set are scanned by and clock pulse synchronized to detect the same input light image pixel gathered by said imager and the diode output signals generated in each set are synchronized and integrated to provide Y primary raster line output signals with improved signal-to-noise ratios; comprising the steps of:
A. adding sufficient fixed delay to each odd order primary raster line output signal of said array to synchronize said primary odd line signal with the next higher even order raster line output signal, and
B. integrating each said primary odd order raster line signal with said next higher even order primary raster line signal, thereby creating V secondary raster line signals having larger signal to noise ratios than said primary signals.

5. The method according to claim 4, wherein $V<Y/2$ further including the steps of;
C. substituting said secondary raster line signals for said primary raster line signals and repeating steps A, B and C until the number of raster line signals substantially equals V.

* * * * *